United States Patent [19]

Stockel et al.

[11] Patent Number: 5,496,445
[45] Date of Patent: Mar. 5, 1996

[54] METHOD AND APPARATUS FOR WASTE PAPER TREATMENT

[76] Inventors: Ivar H. Stockel, 4005 Gulf Shore Blvd. N., Ste. 302, Naples, Fla. 33940; Willard E. Carlson, 17 Strawberry Hill Rd., Hilton Head Island, S.C. 29928

[21] Appl. No.: 131,588

[22] Filed: Oct. 5, 1993

Related U.S. Application Data

[62] Division of Ser. No. 855,212, Mar. 20, 1992, Pat. No. 5,271,805.

[51] Int. Cl.⁶ .................................................. D21C 7/00
[52] U.S. Cl. ........................ 162/248; 162/261; 162/243
[58] Field of Search .......................... 100/104, 179, 100/37, 130; 210/499, 767, 219, 770, 772; 162/4, 55, 56, 57, 261, 251, 234, 235, 243, 245, 233, 242, 248; 241/46.11, 62, 101.2, 16, 21, 25, 28, 38

[56] References Cited

U.S. PATENT DOCUMENTS

| | | | |
|---|---|---|---|
| 2,109,559 | 3/1938 | Wickert | 100/245 |
| 2,954,730 | 10/1960 | Mosen | 100/90 |
| 4,431,480 | 2/1984 | Marklan et al. | 162/19 |

FOREIGN PATENT DOCUMENTS

| | | | |
|---|---|---|---|
| 0768865 | 10/1980 | U.S.S.R. | 162/53 |

*Primary Examiner*—Brenda A. Lamb
*Attorney, Agent, or Firm*—Willard M. Hanger

[57] ABSTRACT

A method and apparatus for reclaiming cellulosic fibers from a bale containing waste papers, in which the bale is positioned in a treatment enclosure, and the enclosure is placed under a vacuum. A treating fluid is drawn into the enclosure, which penetrates the bale interior spaces, and produces a preferential swelling of uncontaminated cellulosic fibers. After the treating fluid is withdrawn from the enclosure, a slurrying fluid is passed through the bale contents, to form a fiber-fluid suspension slurry.

27 Claims, 4 Drawing Sheets

METHOD AND APPARATUS FOR WASTE PAPER TREATMENT

This application is a division of application Ser. No. 07/855,212, filed Mar. 20, 1992 now U.S. Pat. No. 5,271,805.

BACKGROUND OF THE INVENTION

The present invention relates to a method and apparatus for extracting cellulosic fibers from a bale containing waste papers, which contains, a mixture of cellulosic fibers, contaminated cellulosic fibers, and separated or freely dispersed contaminants.

The term contaminants, as used herein, means materials of a non-cellulose fiber character, such as wax, polymer coatings, foil coatings, inks, dirt, stones, etc. The present invention has wide applicability in the recycling of paper products, for reuse in making paper.

In existing processes for making paper it is a common practice to use waste paper materials, either alone, or along with virgin pulp. The waste paper materials, recycled back into the papermaking method, commonly include, e.g. rejected paper stock in the plant, old corrugated containers, paper bags, newspapers, magazines, used paper containers of various types, office waste, mixed waste and old files. Some of these waste paper materials, have coatings thereon that interfere with normal papermaking operations, e.g. wax coatings, impregnated wax, various plastic coatings, and aluminum foil coatings. Dirt, paper clips, wires, some inks, and other contaminants, associated with waste papers, may also pose a problem.

Before the waste paper can be used in the manufacture of new paper, the cellulosic fiber content of the waste paper should preferably be separated from the contaminants. The separation method should be carried out in such a fashion, so as to minimize degradation or damage to the cellulosic fibers, e.g., by cutting, shortening or weakening such fibers.

It is known to recycle waste paper products by mechanically breaking-or tearing apart Such products in a pulper. However, such action damages, and adversely changes, the physical characteristics of the fibers. Also, the pulper does not always completely separate contaminants from the cellulosic fibers. Another disadvantage is the fact that considerable energy is required to effect a desired separating action.

SUMMARY OF THE INVENTION

An object of the present invention is to provide both a method and apparatus for extracting relatively pure cellulosic fibers with desired strength potentials, from bales containing waste paper, having contaminated and uncontaminated cellulosic fibers therein. The term "relatively pure" cellulosic fibers, is herein used, to mean a close approximation of the original virgin pulp fibers, whose cellulose Content is known to vary from about sixty percent to about ninety-nine percent.

In one particular embodiment of the present invention, a bale containing waste paper, is impregnated by a treating fluid, e.g., a dilute solution of ammonium hydroxide, for a period of from about five to about sixty minutes. The basic solution causes the uncontaminated cellulosic fibers to preferentially swell, and debond from each other. Contaminated fibers, undergo swelling at a substantially reduced rate, because coatings on the contaminated fibers, prevent the treating fluid, or swelling agent, from readily wetting the fibers. By subsequently adding water to the swollen fibers, it is possible to form a fiber-fluid suspension, or slurry, that can flow freely in a liquid-like fashion. It thus becomes possible to remove the cellulosic fibers from the contaminated fibers, by draining, or pumping, the fiber-fluid slurry suspension away from contact, or intimate association with, the contaminants or contaminated fibers, i.e., the fibers bound up with other non-fiber substances, such as polymer coatings, wax coatings, impregnations, etc.

Apparently, the cellulosic fibers in waste papers have bond strengths between fibers, which are reduced by swelling, as compared with bond strengths with and between other associated materials, such as polymer coatings, adhesives and foils. By keeping the cellulosic fibers in contact with the treating fluid for only a predetermined limited time period, or time window, it is possible to preferentially swell and debond the uncontaminated cellulosic fibers from each other, while affecting to a much lesser extent the fiber to fiber bonding of contaminated fibers and the fiber to contaminant bonding.

In order for the method to work in an optimum fashion, the treating fluid should be brought into contact with all of the waste paper material, at approximately the same time, so that a major portion of the cellulosic fibers will be exposed to the treating fluid, within an acceptable time window. If this is not the case, then some of the waste paper materials, will be subjected to the treating fluid swelling treatment, for a longer period than desired, while other waste paper materials will be subjected to the treating fluid swelling treatment, for a shorter period than desired. In practice, it is rather difficult to achieve simultaneous contact between the treating fluid and all of the papers in a bale containing waste papers. The straps, twine or wire, holding the bale together, tend to keep the bale contents in close physical contact, such that the treating fluid cannot easily, or quickly, penetrate through the bale outer surface, into interior portions of the bale.

Even when the straps, twine or wires, encircling the bale are broken, the waste papers are often adhered or stacked closely together, such that the treating fluid has difficulty passing through from the exposed outer surfaces of the bale or bale fragments, to the interior of the bale or bale fragments.

In order to ensure timely and approximately simultaneous contact of the treating fluid with all, or most of, the uncontaminated cellulosic fibers in a bale containing waste papers, the present invention contemplates that the entire bale will be located in a vacuum, or near vacuum, enclosure, when the treating fluid is initially brought into contact with the bale. Due to the vacuum, i.e., sub-atmospheric condition, the treating fluid will tend to be rapidly drawn into very tiny crevices, or openings, in the bale, i.e., between adjacent sheets or layers. This condition of gas evacuation, or vacuum impregnation, will overcome such adverse factors, as surface tension and gaseous pressure resistance, so as to more quickly wet a substantial percentage of the cellulosic fibers in the bale.

The term "gaseous pressure resistance" is herein used to mean the resistance to flow offered by a, mass of air trapped in a closed space. Air may be trapped within the bale for a period of time, thereby preventing rapid, or complete, penetration of the fluid into all parts of the bale. However, by placing the enclosure under vacuum before, or during, the treating fluid admission period, it is possible to eliminate, or minimize, the trapped air bubble phenomenon.

The present invention contemplates that the treating fluid will be in essentially laminar flow first, and thereafter, in an essentially still, or stagnant, condition while it is in contact with the waste paper, so that any relative motion between the treating fluid and fibers, does not damage the fibers, or break contaminated papers and contaminants into small pieces, that would be difficult to separate from the swollen fibers. The laminar and then stagnant condition also allows the treating fluid to remain in contact with the bale contents for the necessary time, in order to penetrate, and swell, the uncontaminated cellulosic fibers.

The method of the present invention in some of the invention's embodiments also contemplates one or more enclosure reduction steps, in order to break up the bale, drive the treating fluid into more intimate contact with the cellulose of the uncontaminated fibers, and minimize the ratio of treating fluid to-solids, i.e., paper. Thus, in the example of one of said embodiments, after the bale containing waste papers has been placed into a closed treatment enclosure, a piston will be moved in a direction which will reduce the size of the enclosure. When the treating fluid is later fed, or drawn, into the treatment enclosure, under vacuum, the treating fluid will occupy most of the void spaces, to achieve a high solid-to-fluid volume ratio of at least 20 percent within the bale or the bale fragments. This action will reduce the treating fluid requirement. Depending upon the extent of size reduction of the enclosure, and upon the attachment of breaker bars to the face of the piston, this action may also break up the bale. In the example of another of said embodiments, after the bale containing waste papers has been placed into a closed treatment enclosure and the treating fluid has been fed or drawn into the treatment enclosure, under vacuum, and the treating fluid has occupied most of the void spaces, a piston will be moved in a direction which will reduce the size of the enclosure This action will force treating fluid deeper into the smallest voids inside the bale as well as forcing some of the treating fluid back out of the enclosure. This action may also break up the bale under circumstances described in the previous embodiment.

The present invention contemplates a two stage process, wherein, during the first stage, a treating fluid, i.e., a swelling agent, is brought into contact with the waste paper solids. When the cellulosic fibers have swollen to a desired amount, the treating fluid is withdrawn from the treating enclosure. The second stage involves passing a fluid, usually water, into and through the bale solids, forming a fiber-fluid slurry. During this operation there may be an agitation of the bale solids for at least part of the fluid-solids contact period. The agitation in this second stage is considered to be helpful in separating the uncontaminated fibers, from associated clumps, or pieces of, contaminated waste paper materials, and other contaminants.

The second stage produces a fiber-fluid slurry, that can be pumped, or otherwise separated from, the various contaminants.

In summary, and in accordance with the above discussion, the foregoing objectives are achieved in the following embodiments of the present invention.

1. A method of reclaiming cellulosic fibers from a bale containing waste papers and contaminants, comprising the steps of:

(a) positioning said bale in an enclosure;

(b) withdrawing gas from said enclosure, so that said bale is subjected to a sub-atmospheric pressure;

(c) admitting a first fluid into said enclosure, whereby said first fluid is drawn into interior spaces within said bale;

(d) keeping the bale immersed in said first fluid for a sufficient time, whereby the uncontaminated cellulosic fibers are swollen, significantly reducing the strength of the bonds between said uncontaminated fibers, without similarly reducing the strengths of the bonds among and between contaminated fibers and said contaminants;

(e) removing at least some of said first fluid from said enclosure; and (f) passing a second fluid through said bale contents, to thereby form a slurry containing cellulosic fibers.

2. The method, as described in paragraph 1, wherein said bale is located within said enclosure during step (f).

3. The method, as described in paragraph 1, wherein said bale is located outside said enclosure during step (f).

4. The method, as described in paragraph 1, and further comprising the step (g) of reducing the internal volume of said enclosure after step (a), and prior to step (e).

5. The method, as described in paragraph 4, wherein step (g) is carried out, so that at least one wall of said enclosure deforms said bale.

6. The method, as described in paragraph 4, wherein step (g) is carried out, so that at least one wall of said enclosure breaks said bale into bale components.

7. The method as described in paragraph 4, wherein said enclosure comprises a piston-cylinder means; step (g) being carried out by moving the piston in the cylinder, so as to reduce the cylinder internal volume.

8. The method, as described in paragraph 1, wherein step (f), comprises directing jets of pressurized fluid against said bale contents.

9. The method, as described in paragraph 1, and further comprising the step (h), of mechanically agitating said bale contents with a rotary agitating means during step (f).

10. The method, as described in paragraph 9, wherein step (h), further comprises advancing a rotary agitating means into said enclosure, and rotating said agitating means to redistribute said bale contents in said enclosure.

11. The method, as described in paragraph 1, wherein said bale i's located outside said enclosure during step (f); step (f) being performed by placing said bale contents in a perforated basket, and directing said second fluid into said basket, whereby a slurry containing uncontaminated cellulosic fibers passes out of said basket through said basket perforations.

12. The method, as described in paragraph 1, wherein said bale is located outside said enclosure during step (f); step (f) being performed by placing said bale contents in a vat type pulper fitted with a scavenger wherein the contaminants and contaminated fibers are removed by said scavenger.

13. The method, as described in paragraph 1, wherein said bale is located outside said enclosure during step (f); step (f) being performed by placing said bale contents in a horizontal rotary pulper wherein the slurry containing uncontaminated cellulosic fibers passes out of said pulper through perforations in said pulper.

14. An apparatus for extracting cellulosic fibers from a bale containing waste papers, said apparatus comprising: a base and an annular upstanding wall, cooperatively defining a columnar enclosure, for containment of said bale; means for applying a vacuum to said enclosure; means for passing at least one fiber-treating fluid into and out of said enclosure; means for introducing a slurrying fluid into said enclosure; and means for withdrawing a fiber-fluid slurry from said enclosure.

15. An apparatus for treating cellulosic fibers in a bale containing waste papers, said apparatus comprising: a base and an annular upstanding wall, cooperatively defining a columnar enclosure, for containment of said bale; means for applying a vacuum to said enclosure; and means for passing at least one fiber-treating fluid into and out of said enclosure.

16. An apparatus for treating cellulosic fibers in a bale containing waste papers, said apparatus comprising: an enclosure for containment of said bale; means for introducing said bale into and removing said bale from said enclosure; means for applying a vacuum to said enclosure; and means for passing at least one fiber treating fluid into and out of said enclosure.

17. The apparatus, as described in paragraph 14, wherein said enclosure further comprises a hood structure, raisable and lowerable, relative to said base, and said annular wall, forming part of said hood structure.

18. The apparatus, as described in paragraph 15, wherein said enclosure further comprises a hood structure, raisable and lowerable, relative to said base, and said annular wall, forming part of said hood structure.

19. The apparatus, as described in paragraph 17, wherein said hood structure, further comprises a piston, movable vertically within said annular wall.

20. The apparatus, as described in paragraph 18, wherein said hood structure, further comprises a piston, movable vertically within said annular wall.

21. The apparatus, as described in paragraph 19, wherein said piston has a plurality of breaker bars, said bars presented to said enclosure space.

22. The apparatus, as described in paragraph 20, wherein said piston has a plurality of breaker bars, said bars presented to said enclosure space.

23. The apparatus as described in paragraph 19, and further comprising fluid cylinder means, for moving said piston relative to said annular wall.

24. The apparatus, as described in paragraph 20, and further comprising fluid cylinder means, for moving said piston relative to said annular wall.

25. The apparatus, as described in paragraph 14, wherein said annular wall has an inner perforated lining, defining multiple flow paths, for passing at least one fiber-treating fluid into and out of said enclosure, and for withdrawing a fiber-fluid slurry out of said enclosure.

26. The apparatus, as described in paragraph 15, wherein said annular wall has an inner perforated lining, defining multiple flow paths, for passing at least one fiber-treating fluid into and out of said enclosure.

27. An apparatus for treating cellulosic fibers from a bale containing waste papers, said apparatus comprising: a base; an annular upstanding wall, having an upper end and a lower end, said upstanding wall having a raised position wherein its lower end is spaced away from said base, and a lowered position, wherein its lower end is seated on said base; said annular wall cooperating with said base to form a columnar enclosure for containment of said bale, when said annular wall is in its lowered position; a piston, slidably positioned within said annular wall for vertical motion therealong; said piston being movable downwardly within said annular wall to exert a mechanical force on said contained bale; means for applying a vacuum to said columnar enclosure; and means for passing at least one fiber-treating fluid into and out of said columnar enclosure.

28. The apparatus, as described in paragraph 27, and further comprising, a first fluid cylinder means for raising and lowering said annular wall, and a second fluid cylinder means for raising and lowering said piston relative to said annular wall.

29. The apparatus, as described in paragraph 27, and further comprising, a breaker means carried by said piston, for exerting a breaking action on said contained bale, during downward movement of said piston.

30. The apparatus, as described in paragraph 27, said annular wall, being a hollow wall structure that includes an outer annular casing, an inner lining, and an annular space therebetween; and a series of regularly-spaced flow ports, extending through said lining, to form multiple paths for fluid flow into and out of said columnar enclosure.

31. The apparatus, as described in paragraph 30, and further comprising a series of multiple flow ports in said base, adapted to register with said annular space within said annular hollow wall, when said annular wall is in its lowered position.

32. The apparatus, as described in paragraph 27, and further comprising fluid nozzle means in said base, for directing jets of fiber-slurrying fluid into said enclosure to exert a breaking action on said contained bale, and for feeding fluids into and withdrawing fluids from said enclosure.

33. The apparatus, as described in paragraph 27, and further comprising multiple fluid nozzles, mounted at spaced points around said annular wall, for directing jets of fiber-slurrying fluid into said enclosure, to exert a breaking action on said contained bale.

34. The apparatus, as described in paragraph 33, wherein said fluid nozzles have horizontal trajectories.

35. The apparatus, as described in paragraph 31, and further comprising a mechanical agitating mechanism, mounted in said base, for movement between a standby position, retracted into and/or below said base, and an operating position, projecting upwardly through said base into said columnar enclosure; said agitating mechanism, comprising a post having an upper end, operable to penetrate said contained bale during upward movement of said post to said operating position.

36. The apparatus, as described in paragraph 35, wherein said agitating means, further comprises means for rotating said post around its axis, when said post is in its operating position, and retractable striker elements, carried by said post, for exerting a mixing action on said broken bale.

37. The apparatus, as described in paragraph 36, and further comprising, a fluid nozzle means located on the upper end of said-post, for directing a jet of fluid upwardly, into said bale, facilitating passage of said post through said bale material.

Additional features of the present invention will become apparent, as the detailed description of the preferred embodiments of the present invention, proceeds hereinafter.

BRIEF DESCRIPTION OF THE DRAWINGS

FIGS. 2 through 5, are schematic views, of an apparatus that can be used in practice of the present invention. The different views illustrate the apparatus at different stages of a method for reclaiming cellulosic fibers from waste papers.

DESCRIPTION OF THE PREFERRED EMBODIMENTS OF THE PRESENT INVENTION

Figure 1:
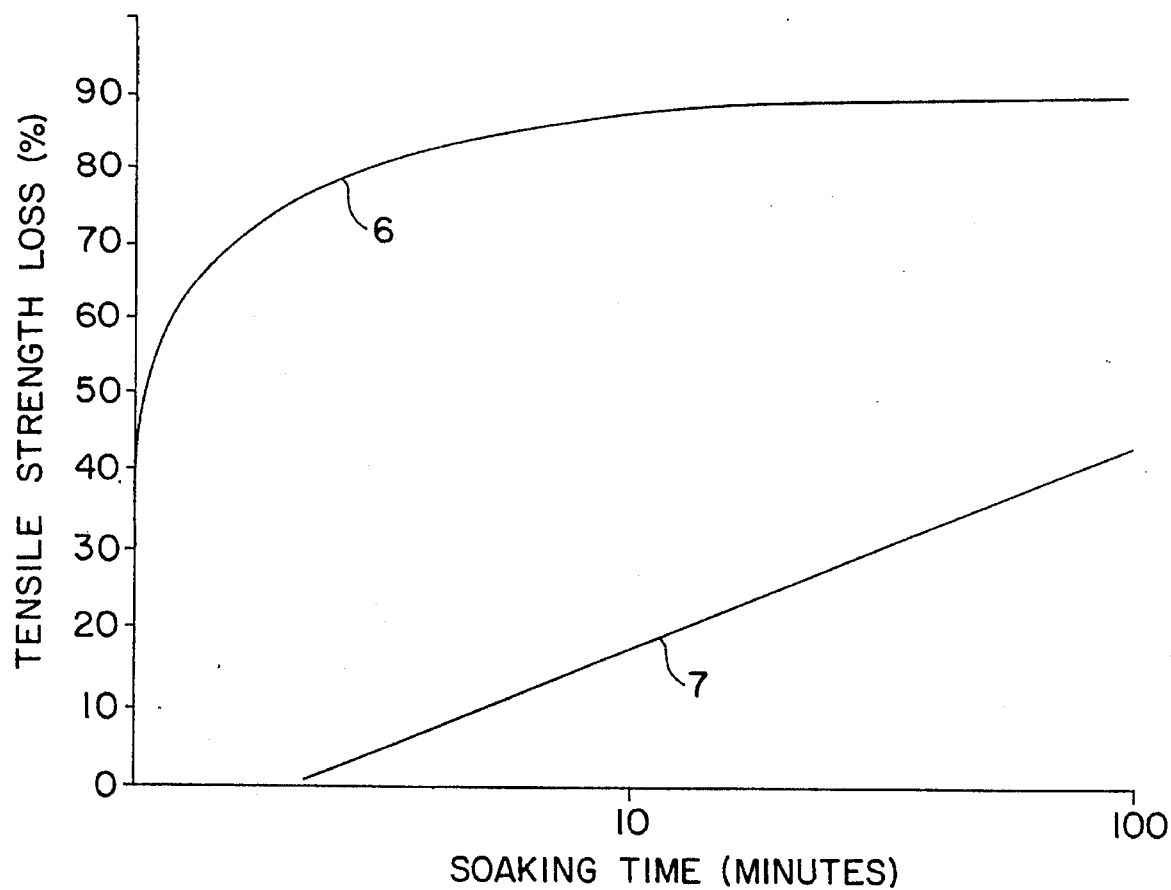
FIG. 1, is a graph, showing the relationship between soaking time and tensile strength loss, for selected waste paper materials, soaked in water containing two percent ammonia.

FIG. 1, is a graph, showing the relationship between soaking time and tensile strength loss, for selected waste paper materials, soaked in water containing two percent ammonia.

FIG. 1, is a graph, depicting tensile strength loss (percentage) for waste paper materials soaked in a two percent ammonia solution. Curve 6, is taken for waste papers in the form of uncoated double-lined Kraft corrugated cuttings, and uncoated old corrugated containers. Curve 7, is taken for wax dipped corrugated containers, and curtain coated corrugated containers. Curve 6, may be considered to represent uncontaminated waste papers, whereas curve 7, may be considered to represent contaminated waste papers. It will be seen that the time required for the materials to lose their tensile strength, is much shorter for the curve 6 materials, as compared to the curve 7 materials.

Loss of bonding strength in the cellulosic fibers occurs, as the treating fluid causes the fibers to swell, and undergo a debonding action. It will be seen from the graph, that the uncontaminated cellulosic fibers, i.e., curve 6, have lost a substantial percentage of the original tensile strength after about twenty minutes soak time, whereas the contaminated cellulosic fibers, i.e. curve 7, still retain a substantial percentage of the original tensile strength after the same soak time. Soaking in a basic treating fluid such as ammonia, for a predetermined time period, e.g., twenty minutes, represents a method that can be used to separate uncontaminated waste paper fibers, from contaminated, e.g., certain coated and impregnated, etc., waste paper fibers.

FIGS. 2 through 5, are schematic views, of an apparatus that can be used in practice of the present invention. The different views illustrate the apparatus at different stages of a method for reclaiming cellulosic fibers from waste papers.

Figures 2, 3, 4, 5:
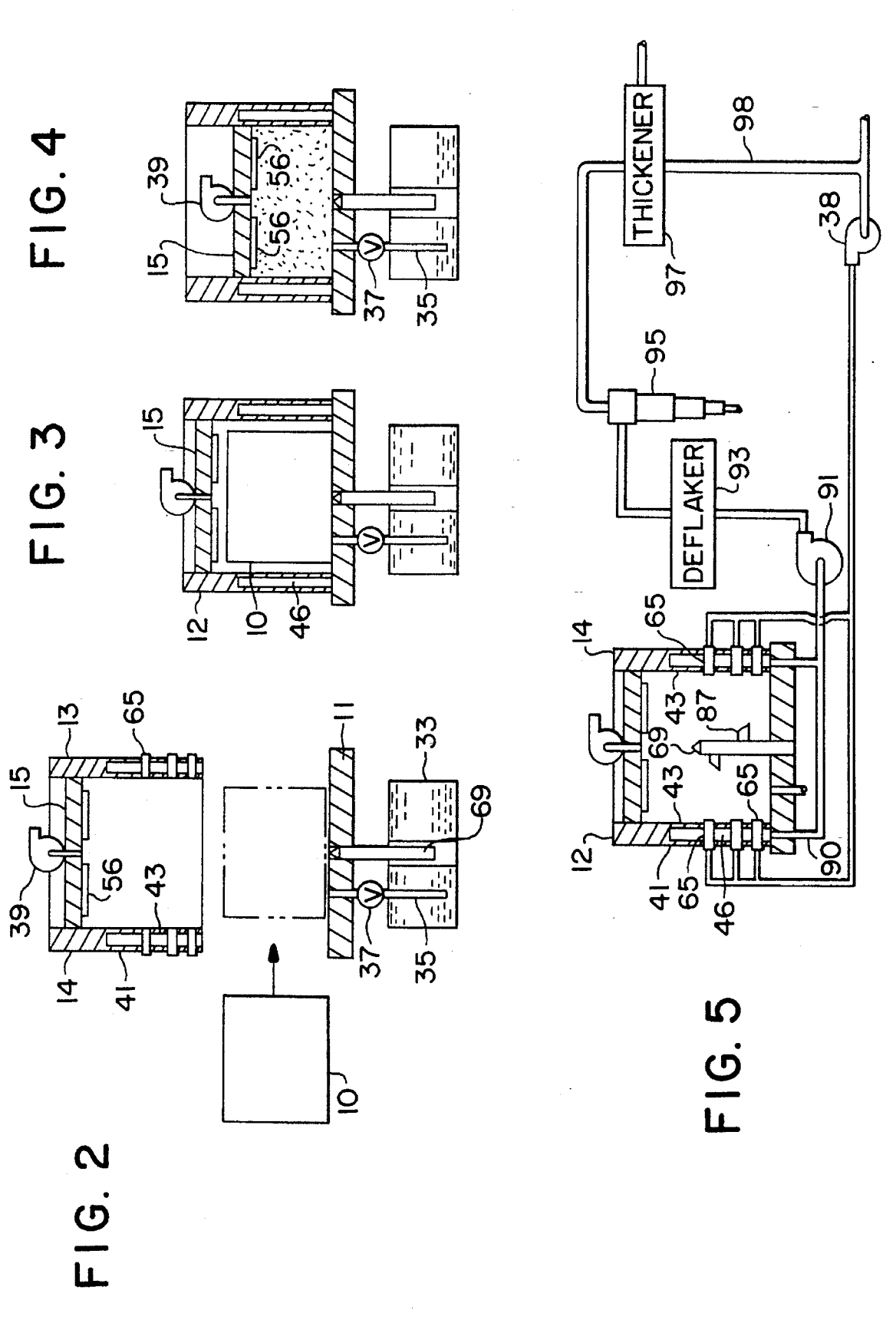

One, or more, bales 10, containing waste paper, bound with wires or straps, is/are moved onto a base 11, for treatment. Reference to "bale" or "bales" herein, in either case may indicate either a singular bale or a plurality of bales. A treating enclosure 12, comprises base 11, and a raised hood, or housing, 14. After the bale 10, is positioned on base 11, the hood 14, is lowered onto the base 11, as shown in FIG. 3. Hood 14, comprises an upright tubular cylinder 13, and a piston 15. However, hood, or housing, 14, may also, in certain embodiments be comprised of a not fully rigid structure, where desirable. In the lowered position of the hood 14, piston 15, can be moved vertically within the cylinder 13.

A reservoir of treating fluid 33, is connected to base 11, via a fluid line 35, containing a valve 37. By reducing the pressure within enclosure 12, it is possible to draw treating fluid, from treating fluid reservoir 33, through line 35, and into the enclosure 12. Various treating fluids can be used in this invention, e.g., sodium hydroxide, sodium carbonate, ammonia, sodium hypochlorite, etc. The treating fluid, has as its primary purpose the controlled swelling and debonding of the uncontaminated fibers in bale 10, without similarly swelling or attacking the coated fibers and contaminants, such as plastics, adhesives, stones, paper clips, etc., within the desired time window. Additionally, other fluids, having other than swelling and debonding capabilities, may also be employed, either in the treating fluid stage, or subsequent stages.

With bale 10 within enclosure 12, the internal volume of enclosure 12 is reduced to approximately the value depicted in FIG. 4. Thus, piston 15, can be moved vertically downwardly within cylinder 13, from the FIG. 3 position to the FIG. 4 position. The purpose for moving the piston 15 downwardly within cylinder 13, is to break the bindings that hold the bale 10 together, and also to eliminate excess volume within the enclosure 12, and further to deform and break apart the bale 10, and to further force the treating fluid into the smallest voids within the bale. Piston 15, is equipped with a number of radially-oriented breaker bars 56. As the piston 15 descends within cylinder 13, the breaker bars 56, break the wires or straps that bind the bale 10 together. The descending piston 15, also causes the bale 10, to at least partially break apart within the enclosure 12.

A vacuum means 39, which may be either a vacuum pump, or other vacuum means, is located to draw air gases out of enclosure 12, thereby reducing the space within the enclosure 12 to a near-vacuum condition. Thereafter, valve 37 can be opened, so that treating fluid is drawn under vacuum, from treating fluid reservoir 33, through line 35, and into the enclosure 12. The treating fluid quickly penetrates the small pores and crevices within bale 10. The step of placing the enclosure 12 under a vacuum, can be performed before, during, or after the step of lowering piston 15 to the FIG. 4 position. In the illustrated embodiment, the treating fluid is admitted to the enclosure 12, after the piston is in the FIG. 4 position.

The treating fluid is permitted to remain in the enclosure 12, in contact with waste paper materials of bale 10, for sufficient-time to ensure a preferential swelling and debonding of the uncontaminated fibers in bale. 10. The period of sufficient time depends upon the grade of waste paper being treated and upon the temperature and chemical composition of the treating fluid. In the case of old corrugated containers being treated with a two percent ammonia solution, a period of about twenty minutes is usually sufficient. When the uncontaminated cellulosic fibers have sufficiently swelled, the excess treating fluid is allowed to return through line 35, into fluid reservoir 33. This may be accomplished by removing the vacuum force, e.g., by venting the enclosure 12 to the ambient atmosphere, and opening valve 37. Also, piston 15, can be lowered an additional amount from its FIG. 4 position, in order to exert a pressing, or squeezing action, on the bale contents or components, aiding in moving the excess treating fluid down into the fluid reservoir 33. When the excess treating fluid has been returned to fluid reservoir 33, valve 37 is then closed. Make-up treating fluid is added to reservoir 33 to maintain the amount and chemical strength of the treating fluid. It should also be noted, that in appropriate circumstances, more than one treating fluid may be applied to the bale contents, either sequentially or at the same time.

FIG. 5, illustrates the apparatus in position for removing the swollen uncontaminated cellulosic fibers from enclosure 12. Three, or more, horizontal rows of high pressure fluid nozzles 65, are arranged in the wall of cylinder 13, to spray jets of a fluid, e.g. water, into the enclosure 12. The number and location of nozzles 65 can be varied, as desired. However, in a typical application, there might be a total of about fifteen nozzles 65, arranged with five nozzles 65, in each of the three rows. The nozzles 65, are oriented to spray water, or other fluid, generally tangential in direction, and not necessarily directly toward the central axis. A pump 38, is provided in this embodiment of the apparatus to supply pressurized water to the various nozzles 65.

Cylinder wall 13, is of hollow construction, comprising an outer imperforate casing 41, and an inner perforated liner 43. A hollow annular space 46, is defined between casing 41 and perforated liner 43. Annular space 46, communicates with a ring of ports (not shown), in base 11, that then connect through a three way valve (not shown) with piping systems 90 and 35. Pump 91, draws a fiber-fluid slurry from annular space 46, through piping system 90.

In overall operation, in the second stage, water (fluid) is fed into the enclosure 12 through nozzles 65. The water entrains the swollen cellulosic fibers to form a fiber-water (fluid) slurry. Pump 91, draws the fiber-water slurry out of the enclosure 12, through a path which comprises the perforations (openings) in liner 43, annular space 46, and base 11, and said three way valve (not shown), and the piping system 90. The perforations in liner 43, are sized to retain most of the contaminants and contaminated fibers within enclosure 12. The fiber-water (fluid) slurry, possibly containing some contaminants, may then be passed through a deflaker 93, a hydrocylone 95, and a thickener 97, to remove any undesired particulates, and to provide a fiber-water slurry of desired fiber content. Water, removed by thickener 97, can be returned (recycled) from the thickener 97, to pump 38, via a water return line 98.

The operation of the FIG. 5 apparatus, may be somewhat improved, if desired, by including within the apparatus an agitating mechanism, depicted as 69. During the first' stage of the operation, as represented by FIGS. 2 through 4, the agitating mechanism 69, is in a retracted position, located generally below enclosure 12. During the second stage, as represented in FIG. 5, the agitating mechanism 69 is elevated, so that it extends within the contents of the disintegrated bale 10. A power mechanism (not shown here) is used to move the agitating mechanism 69 between its two positions. In its elevated position, the agitating mechanism 69, is adapted to rotate around its axis, in order to agitate and slush the' softened and swollen fibrous materials, in the fiber-fluid slurry. Arms 87, extend from the post portion of the agitator mechanism 69, to perform an agitating function. Arms 87, and the supporting post, also tend to attract, and collect, any ropes, Strings, wires, or other contaminants, that might tend to blind the perforations in liner 43.

After pump 91 has pumped a sufficient amount of fiber-water slurry out of enclosure 12, the enclosure 12 is drained, and the agitator mechanism 69, is returned to its retracted position. Hood 14, may then be raised to the FIG. 2 position, and contaminants swept off, or otherwise removed from base 11, to reset the apparatus for reception of another bale 10, or bales 10, containing waste paper materials.

Figure 6:
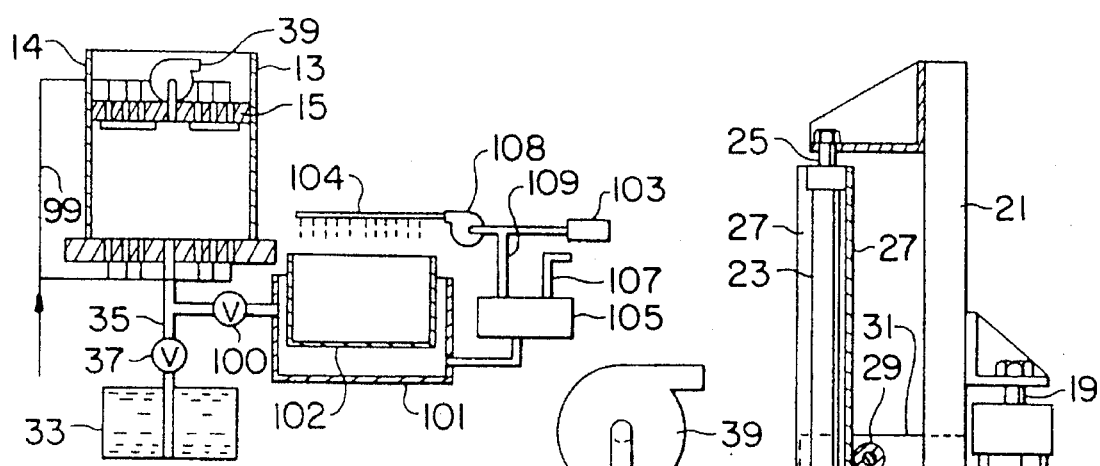
FIG. 6 is a schematic view of another apparatus embodying features of the present invention.

FIG. 6, is a schematic view of another apparatus embodying features of the present invention.

In this embodiment, cylinder 13, is a single annular wall, rather than a double wall construction, as earlier described. Hood structure 14, is raisable and lowerable, as earlier described, whereby the bale 10 of waste paper is positionable within the defined enclosure 12. After the enclosure has been placed under a vacuum, via a vacuum means, such as pump 39, etc., the treating fluid is drawn from reservoir 33, by opening valve 37.

The treating fluid, is allowed to remain in the enclosure for a sufficient time, as discussed above, to produce the necessary swelling of the cellulosic fibers, the enclosure is then vented, after which valve 37 is then opened to drain the treating fluid back into reservoir 33. The method up to this point, is similar to the method as described with the apparatus shown in FIGS. 2 through 5.

In this embodiment, fluid ports are formed in base 11 and piston 15, whereby pressurized fluid (water), can also be supplied through line 99, to aid in disintegration of the bale 10 components. The action of the water jets produced here, is similar to that produced by the aforementioned nozzles 65, except that during the disintegration period, in this embodiment, the enclosure may be in a closed position, and the water may not flow out of the enclosure.

At the conclusion of the disintegration period or before a valve 100, is opened to enable the fiber-water (fluid) slurry to gravitationally flow from the enclosure into a sump 101. A basket 102, is positioned within, or above, the sump 101, to receive the bale contents still remaining in the enclosure. Then, hood 14 is raised, and the bale contents plowed, or otherwise transferred, to the basket 102. The bottom wall of the basket 102, is also perforated.

With the loaded basket 102 positioned above sump 101, water is pumped from source 103, by a pump 108, into a shower system 104, located above the basket 102. Water flushes downwardly from the shower system 104, through the contents in basket 102, to carry cellulosic fibers into sump 101. The perforations in the basket 102, are sized, so that most of the contaminants are retained in the basket 102.

The fiber-water liquid slurry, accumulated in sump 101, can then be subjected to various treatments, to purify and condition it, for use in papermaking operations. As shown in FIG. 6, the fiber-water slurry may then be passed through a thickener 105, to remove excess water from the slurry. The fiber product exits through a line 107, while water removed by the thickener 105 is returned to pump 108, via line 109.

Figure 7:
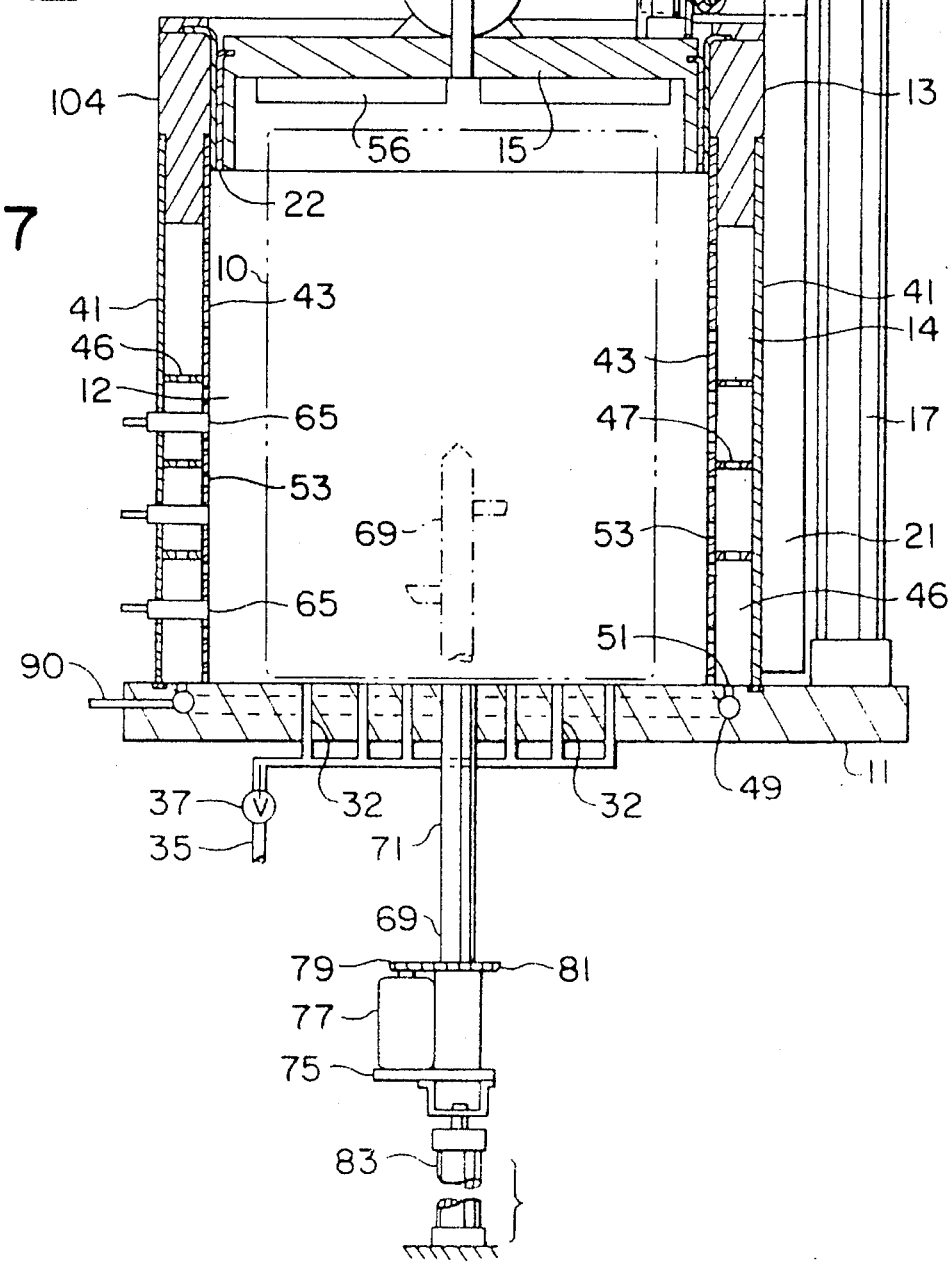
FIG. 7, is an enlarged view of the apparatus depicted in FIGS. 2 through 5.
Figure 8:
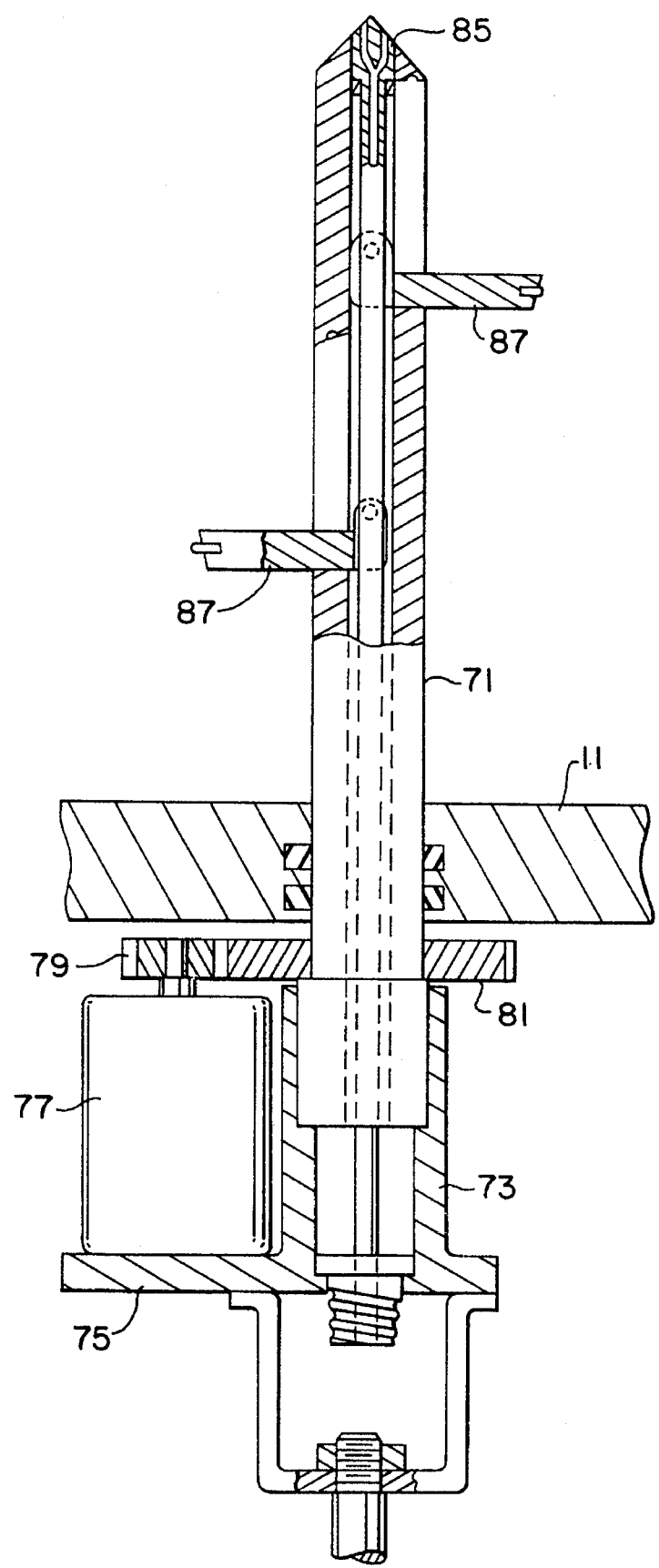
FIG. 8, is an enlarged sectional view of a retractable agitator mechanism, used in the FIG. 7 apparatus.

FIGS. 7 and 8 illustrate some structural features of the apparatus in greater detail.

FIG. 7, is an enlarged view of the apparatus depicted in FIGS. 2 through 5.

FIG. 8, is an enlarged view of a retractable agitator mechanism, used in the FIG. 7 apparatus.

Referring now to FIG. 7, which shows in greater detail, features of the FIGS. 2 thru 5 apparatus, the following is an expanded disclosure. In FIG. 7, there is shown a mechanism for raising or lowering hood structure 14. Multiple fluid cylinders 17, have piston rods 19, connected to vertical reinforcement bars 21, attached to wall 13, of the hood structure 14. The number of fluid cylinders can be varied, e.g., typically four cylinders can be used. Each reinforcement bar 21, may have any desired cross section, suited to its reinforcement function, e.g., a square hollow tubular configuration, an H-shaped cross section, or a channel cross section, etc. Simultaneous introduction of pressure fluid into the lower end of each fluid cylinder 17, raises hood 14, to a loading position, permitting insertion of bale 10 into the treatment space, defined by enclosure 12. By pressurizing the upper end of each cylinder 17, hood 14 is brought downwardly to the closed position, as shown in FIG. 7.

Piston 15, is connected to annular wall 13, via a rolling or folding, diaphragm 22, sometimes known as a bellofram. The piston 15, is shown in an elevated position, at the upper end of annular wall 13. However, the piston 15 is designed to be moved downwardly within wall 13 to reduce the size of the treatment enclosure 12. The piston 15, is suspended within wall 13, by means of four fluid cylinders 23. Each fluid cylinder 23, has its piston portion 25 attached to an associated upright reinforcement bar 21, and its cylinder portion attached to piston 15.

Proper linear guidance of the piston 15 can be achieved by providing a guide channel 27, partially surrounding the fluid cylinder 23. A cooperating guide roller means 29, is mounted between two spaced arms 31, that extend from bar 21 across guide channel 27 As the four fluid cylinders 23, power piston 15 downwardly within wall 13, each guide channel 27, is guided by the associated guide roller means 29, and arm structure 31. It is noted that each fluid cylinder 23, is a double-acting cylinder.

The treating fluid, or swelling fluid, may be stored in a reservoir (not shown) located below base 11. The treating fluid may be at room temperature, or heated. Heating of the treating liquid, shortens the treatment, or swelling, cycle time, and also increases the cellulosic fiber yield. However, some contaminants, such as wax, etc., melt, or otherwise go into suspension, at temperatures of about 120 degrees Fahrenheit. Therefore, lower temperatures of the treating fluids, are preferred. For safety reasons, in those instances where it may not be prudent to pump, or otherwise violently spray, hazardous treating, and other, fluids, e.g., hot caustic solutions, etc., the methods herein utilize liquid flow, resulting from either gravity, or differences in relative pressures, i.e., vacuum suction, or the like.

As shown in FIG. 7, a treating fluid supply line 35, leads from the treating fluid reservoir (not shown), to base 11, of the treatment enclosure. A shut-off valve 37, is provided in the supply line 35, to control or stop the treating fluid flow. The treating fluid, may be admitted to and withdrawn from enclosure 12, through a plurality of port 32, formed, in part, in base 11.

Annular wall 13, is a hollow wall construction, comprising an outer annular casing 41, and an inner rigid liner 43, spaced from annular casing 41, to define an annular hollow space 46, therebetween. Apertured bulkheads 47, interconnect casing 41 and inner liner 43, to rigidify the wall 13 structure, against collapse under the liquid and vacuum loadings thereon.

Base 11, has an annular internal flow duct 49, that interconnects with annular space 46, via a ring of regularly spaced ports 51. Each port 51, should have an appropriate diameter to permit relatively unimpeded fluid flow between annular space 46 and duct 49. Cellulosic fiber suspension is withdrawn from, and treating fluid may be admitted to, and withdrawn from, the apparatus by allowing flow, to and/or from annular space 46, through ports 51, into, or out of, annular duct 49. Annular duct 49 is connected through a three-way valve, or its equivalent (not shown), to the aforementioned fluid supply line 35, or fluid return line 90, at one or more points along duct 49.

Treatment enclosure 12, is defined by the inner surface of annular liner 43. The liner 43, has a large multiplicity of ports 53, extending therethrough at regularly spaced points along the liner 43 inner surface. Each port 53, has a diameter, measuring from about one-quarter inch, up to about two inches, which is of sufficient size to pass the fibrous fluid slurry produced in the treatment enclosure 12, but which is insufficient to pass most contaminants, such as contaminated papers, coated papers, pieces of foil, plastics, film, etc. The spacing between ports 53, can vary within rather large limits, depending upon hole size, wastepaper grade, etc., and established strength and stiffness guidelines, as long as there is a large multiplicity of flow paths for the treating fluid and fibrous suspension.

Before, during or after the treating fluid is initially introduced to the treating enclosure 12, via ports 32, in base 11, and via ports 53, in annular liner 43, piston 15 is lowered within wall 13, by actuation of cylinders 23. There are preferably four or more vertical breaker bars 56, mounted on the undersurface of piston 15. The breaker bars 56, are preferably arranged in a radial pattern, i.e., on radial lines generated from the piston axis.

As piston 15, is powered downwardly within annular wall 13, bars 56, exert fracturing forces on the straps or wires that are used to hold bale 10 together. Additionally, the face of the piston 15, exerts a downward force on the bale 10. As a result, the straps or wires break, such that the contents of bale 10 can collapse outwardly toward liner wall 43, and downwardly toward base 11.

Before, during, or after the downward stroke of piston 15, a vacuum means, or, in this case, vacuum pump 39, is operated to substantially evacuate the air remaining in the treatment enclosure 12 and bale contents 10. Although a motor-operated pump 39 is shown herein as the vacuum means employed, it should be understood that other types of vacuum-producing devices can be used, e.g., an aspirator, a vacuum accumulator, etc. The evacuation of air from the enclosure 12, provides a sub-atmospheric condition within the treatment enclosure 12, relative to the external atmospheric pressure.

When valve 37 is opened, the three-way valve (not shown) is set to connect line 35 to annular duct 49, and the treating fluid flows from the reservoir upwardly in this embodiment, through fluid line 35, into the treatment enclosure 12, via ports 32 and 53. The reduced pressure in the treatment enclosure 12, also draws the treating fluid into he tiny voids and crevices in the bale 10, thereby quickly bringing the treating fluid into essentially simultaneous contact with all interior surfaces of the bale constituent layers. FIG. 7, shows three fluid nozzles 65, arranged one above the other. Each nozzle 65, has a horizontal trajectory, going radially toward the chamber central axis, or at an acute angle to a radial line, designed to promote a swirl motion. In this embodiment, there are actually three rows of nozzles 65, with four or five nozzles 65 in each row, resulting in a total of twelve or fifteen nozzles 65. Each nozzle 65, has a horizontal trajectory angled toward the chamber central axis. However, other configurations of nozzle 65, and number of nozzles 65, are also envisioned.

The bank of nozzles 65, is connected to a motor-operated pump 38, shown in FIG. 5 that provides the entire supply of fluid, usually water, for the second stage in the process.

A mechanical agitation mechanism 69, shown fragmentarily in FIG. 7, is provided for applying an agitating force to the contents, or components, of the broken bale 10, during the second stage of the process. During the first stage, i.e., the treating fluid stage, the agitation mechanism 69 is retracted into, or below, base 11, to assume an inoperative standby condition.

FIG. 8, is an enlarged sectional view of the agitator mechanism 69, used in the apparatus of FIG. 7, as well as the apparatus of FIGS. 2 thru 5. As seen in FIG. 8, the agitating mechanism, comprises a vertical post 71, having rotary support in a sleeve bearing 73 which is carried on a platform 75. Electric motor 77, drives a spur gear 79, which meshes with a second gear 81, carried by post 71. The post 71, is thus powered for rotary motion around its axis. As fragmentarily shown in FIG. 7, platform 75 is connected to the piston portion of the fluid cylinder 83 (shown in FIG. 7). The fluid cylinder 83, can be actuated to raise or lower post 71 between the two positions, i.e., the operating, or retracted standby positions.

In order to assist the post 71, in better penetrating the broken bale 10, the upper end of the post 71 may have a conical'shape. Also, a high pressure fluid (water) nozzle 85, may be located on the upper end of the post 71. Pressurized fluid, usually water, is supplied to the nozzle 85, through a small tube or conduit extending vertically through the post 71. The nozzle 85 trajectory is directly up, such that the nozzle 85 output stream, tends to burrow one or more holes through the bale 10 as the post is raised by fluid cylinder 83.

As also shown in FIG. 8, post 71, carries two swingable agitator arms, or striker elements 87. As the post 71 begins to rotate, the striker elements 87, are thrown outwardly from the post 71 by centrifugal action. The agitator arms 87, act as a "ragger" impeller for agglomerating and collecting contaminants, such as wires, strings, films, etc., as well as an agitator to accelerate, or further increase, the bale breakage method and fiber dispersion. After the second stage of the method is complete, the agitator mechanism 69, is lowered, or retracted into, and/or below, base 11. The agitator arms 87, fold into post 71, during the downward motion of the post 71. Spring-urged bullet latches may be carried on the free ends of arms 87, in order to hold them in their folded positions while the agitator mechanism 69, is in its retracted condition.

The drawings contained herein necessarily depict specific embodiments of the apparatus, useful in practice of the present invention. However, it will also be appreciated by those skilled in the arts pertaining thereto, that the present invention can be practiced in various forms and configurations.

Further, the detailed description of the preferred embodiments of the present invention, is presented for purposes of clarity of understanding only, and no unnecessary limitations should be understood or implied therefrom. Finally, all mechanical and functional equivalents to the above, which may be obvious to those skilled in the arts pertaining thereto, are deemed to be encompassed within the claims of the present invention.

What is claimed is:

1. An apparatus for treating cellulosic fibers from a bale containing waste papers, said apparatus comprising: a base; an annular upstanding wall, having an upper end and a lower end, said annular wall having a raised position wherein its lower end is spaced away from said base and a lowered position, wherein its lower end is seated on said base; said annular wall cooperating with said base to form a columnar enclosure for containment of said bale when said annular wall is in its lowered position; a piston slidably positioned within said annular wall for vertical motion therealong; said piston being movable downwardly within said annular wall to exert a mechanical force on the contained bale; means for applying a vacuum to said columnar enclosure; and means for passing at least one fiber-treating fluid into and out of said columnar enclosure.

2. The apparatus, as described in claim 1, further comprising a first fluid cylinder means for raising and lowering said annular wall, and a second fluid cylinder means for raising and lowering said piston relative to said annular wall.

3. The apparatus, as described in claim 1, further comprising a breaker means carried by said piston for exerting a breaking action on the contained bale during downward movement of said piston.

4. The apparatus, as described in claim 1, said annular wall being a hollow wall structure that includes an outer annular casing an inner lining, and an annular space therebetween; a series of regularly-spaced flow ports extending through said lining to form multiple paths for fluid flow into and out of said columnar enclosure.

5. The apparatus, as described in claim 7, further comprising a fluid nozzle means located on the upper end of said post for directing a jet of fluid upwardly into said bale facilitating passage of said post through the contained bale.

6. The apparatus, as described in claim 5, further comprising a mechanical agitating mechanism, mounted in said base for movement between a standby position retracted into and/or below said base and an operating position projecting upwardly through said base into said columnar enclosure; said agitating mechanism comprising a post having an upper end operable to penetrate the contained bale during upward movement of said post to said operating position.

7. The apparatus, as described in claim 6, wherein said agitating means further comprises means for rotating said post around its axis when said post is in its operating position and retractable striker elements carried by said post for exerting a mixing action on the contoured bale.

8. The apparatus as described in claim 7, further comprising a fluid nozzle means located on the upper end of said post for directing a jet of fluid upwardly into said bale facilitating passage of said post through the contained bale.

9. The apparatus, as described in claim 1, further comprising fluid nozzle means in said base for directing jets of fiber-slurrying fluid into said enclosure to exert a breaking action on the contained bale and for feeding fluids into and withdrawing fluids from said enclosure.

10. The apparatus, as described in claim 1, further comprising multiple fluid nozzles mounted at spaced points around said annular wall for directing jets of fiber-slurrying fluid into said enclosure to exert a breaking action on the contained bale.

11. The apparatus, as described in claim 10, wherein said fluid nozzles have horizontal trajectories.

12. An apparatus for extracting cellulosic fibers from a bale containing waste paper, said apparatus comprising:

a base and an annular upstanding wall cooperatively defining a columnar enclosure for containment of said bale, said enclosure comprising a hood structure adapted for being raised and lowered relative to said base with said annular wall forming a part of said hood;

means for applying a vacuum to said enclosure;

means for passing at least one fiber-ring fluid into and out of said enclosure;

means for introducing a slurrying fluid into said enclosure;

and means for withdrawing a fiber-fluid slurry from said enclosure.

13. The apparatus, as described in claim 12, wherein said hood, further comprises a piston, movable vertically within said annular wall.

14. The apparatus, as described in claim 13, wherein said piston has a plurality of breaker bars, said bars presented to said enclosure.

15. The apparatus, as described in claim 13, further comprising fluid cylinder means, for moving said piston relative to said annular wall.

16. The apparatus, as described in claim 12, wherein said annular wall has an inner perforated lining defining multiple flow paths for passing said at least one fiber-treating fluid into and out of said enclosure and for withdrawing a fiber-fluid slurry out of said enclosure.

17. An apparatus for treating cellulosic fibers in a bale containing waste paper, said apparatus comprising:

a base and an annular upstanding wall cooperatively defining a columnar enclosure for containment of said bale, said enclosure comprising a hood structure adapted for being raised and lowered relative to said base with said annular wall forming a part of said hood structure;

means for applying a vacuum to said enclosure;

and means for passing at least one fiber-treating fluid into and out of said enclosure.

18. The apparatus, as described in claim 17, wherein said hood structure further comprises a piston movable vertically within said annular wall.

19. The apparatus, as described in claim 18, wherein said piston has a plurality of breaker bars, said bars presented to said enclosure space.

20. The apparatus, as described in claim 18, and further comprising fluid cylinder means, for moving said piston relative to said annular wall.

21. The apparatus, as described in claim 17, wherein said annular wall has an inner perforated lining defining multiple flow paths for passing said at least one fiber-treating fluid into and out of said enclosure.

22. In a waste material recycling installation for recovering paper fibers from waste paper contained in waste material packaged in bale form, including means for the wetting impregnation of said bale with a cellulosic fiber softening and swelling fluid to a sufficient degree as establishes a debonding swelling of cellulosic fibers of said bale and means for extracting from the fluid impregnated bale a pulp slurry of the swollen debonded cellulosic fibers, the improvement wherein said wetting impregnation means comprises:

a chamber internally sized to contain said bale and adapted to receive said bale and seal the interior of said chamber containing said bale from the atmosphere, said chamber comprising:

a base and a vertically displaceable hood having a top portion extending transversely of a columnar annular wall portion vertically depending below said hood top portion and cooperating with said base in defining said chamber when said hood is in a lowered position with the lower end of the hood wall portion in contact with said base and means vertically displacing said hood between said lowered position and a raised position in which said hood wall lower end is spaced above said base;

means establishing a vacuum pressure within said chamber;

means introducing into and retaining in said chamber said softening and swelling fluid for establishing said debonding swelling of the cellulosic fibers in said bale;

and said slurry extracting means comprises:

means introducing a slurrying fluid into said chamber into contact with the contents of the swelling fluid impregnated bale and means for withdrawing from said chamber cellulosic fiber containing slurry resulting from contact of said slurrying fluid and the waste paper debonded swollen fibers.

23. The waste material recycling installation of claim 22 wherein the hood wall portion comprises an annular outer casing and an inner lining with an annular space therebetween, said inner lining having a plurality of apertures interconnecting the interior of said chamber and said annular space, said apertures being sized to restrict passage therethrough to a fluid suspension of cellulosic fibers and said withdrawal means being adapted to withdrawing pulp slurry through said annular space.

24. The waste material recycling installation of claim 22 wherein said slurrying fluid introducing means include means directing jet streams of slurrying fluid inwardly of the chamber interior as impinge on the fluid impregnated bale contents of said chamber.

25. The waste material recycling installation of claim 24 wherein the jet directing means includes nozzle means having a plurality of orifices mounted circumferentially of the hood annular wall portion and directed centrally thereof.

26. The waste material recycling installation of claim 22 wherein at least a portion of the hood top portion is mounted for movement within and lengthwise of the hood wall portion between a raised position and a lowered position in pressing contact with contents of said chamber and said chamber includes means for moving said hood top portion between said raised and lowered positions.

27. The waste material recycling installation of claim 25 additionally including an agitator unit comprising:

a mixer mounted for movement between a retracted position below said base and an operating position projecting upwardly through said base with the interior of said chamber, said mixer having a post rotatable about its axis with retractable striker elements mounted on the upper end of said post, means for rotating said post about its axis, and means for moving said mixer between said retracted and operating positions.

* * * * *